United States Patent Office 3,414,616
Patented Dec. 3, 1968

3,414,616
CARBON CATALYSIS OF CONDENSATION OF CARBONYL COMPOUNDS AND AMINES
Charles G. Summers, Scott Depot, W. Va., assignor to Monsanto Company, St. Louis, Mo., a corporation of Delaware
No Drawing. Continuation-in-part of application Ser. No. 370,049, May 25, 1964. This application Apr. 13, 1966, Ser. No. 542,205
18 Claims. (Cl. 260—566)

This application is a continuation-in-part of application Ser. No. 370,049, filed May 25, 1964, now abandoned.

The present invention relates to the catalytic condensation of carbonyl compounds and amines. More particularly, it relates to carbon catalysis of the reaction between carbonyl compounds and primary amines either under hydrogenating or nonhydrogenating conditions. The condensation products of primary amines with carbonyl compounds whereby the double bond of the carbonyl compound is linked to nitrogen are known as imines or Schiff bases. Both the formation of imines and reduction thereof to the corresponding secondary amines are catalyzed by carbon.

It is well known that acids catalyze the condensation of amines and carbonyl compounds, but acids are corrosive and do not necessarily provide the required rate of condensation and completeness of reaction. Acid clays have been proposed as catalysts, but are subject to the same shortcoming. Furthermore, the imine is often required simply as an intermediate for production of secondary amines by catalytic reduction over hydrogenation catalyst, and for most efficient operation the reactions are conducted simultaneously. The catalyst must be recovered for economic operation, but the presence of clay interferes with recovery.

The discovery that carbon alone catalyzes formation of imines permits the attainment of important economies. The reactions can be carried out in mild steel equipment without significant corrosion by selection of suitable non-corrosive carbon catalysts. The excess of carbonyl compound reacted can be reduced, thereby increasing the production capacity of the equipment. The loss of carbonyl compounds through reduction to the alcohol is reduced, resulting in higher yield on the carbonyl compound. Finally, the recovery of metal hydrogenation catalysts is simplified because the carbon can simply be burned away.

As illustrative of the catalytic effect of carbon on imine production, a suitable reactor fitted with a water trap and condenser is charged with 0.5 gram molecular proportions of 4 - aminodiphenylamine, 1.5 grams molecular proportions of methyl isobutyl ketone, and 2.2 grams of carbon as catalyst. The carbon is a charcoal made from organic material obtained in the manufacture of cellulose (Nuchar KPC). After heating 300 minutes at 118°–134° C., the amount of water expected for 100% conversion to the desired imine, N - 1,3 - dimethyl - 1 - butylidene) N'-phenyl-p-phenylenediamine is collected. When the reaction is repeated in the absence of carbon catalyst, no water is collected; and no reaction takes place after heating 120 minutes at the same temperature. When the reaction is again repeated without carbon, no reaction is observed after heating 60 minutes; but, upon the addition of 2.2 grams of the aforesaid carbon, by-product water is formed, and after a total heating time of 170 minutes the amount collected corresponds to 88% completion of the reaction.

As illustrative of the use of carbon catalyst in conjunction with reductive alkylation to produce secondary amines through the corresponding imine, a stainless-steel pressure vessel is charged with 0.8 gram moles of para-nitroaniline, 4.0 gram moles of methyl isoamyl ketone and hydrogenation catalyst (1% platinum supported on carbon). Molecular hydrogen under pressure is introduced and the nitro compound is reduced at 100° C. under 200 pounds hydrogen pressure per square inch. When the hydrogen up-take ceases and the exothermicity of the reaction subsides, the temperature is raised and the reaction mixture heated under 400 pounds per square inch hydrogen. The imines which continuously form throughout the heating are thereby reduced. The table below indicates the charge of hydrogenation catalyst, type and charge of carbon co-catalyst, and the percent of unreacted amine found after various times of heating. Time of heating is counted from the time the reaction mixture reaches 100° C. Except in Experiment No. 5306, in which the imine is reduced at 125° C., the temperature is 140° C. for reduction of the imine.

TABLE I

| Exp. No. | Hydrogenation Catalyst, grams | Co-Catalyst | Grams | Percent Unreacted Intermediates After— | | | |
|---|---|---|---|---|---|---|---|
| | | | | *30 | *45 | *60 | *75 |
| 5306 | 4 | General purpose gas black (Dixie 5). | 10 | 0.50 | | | |
| 5307 | 4 | ---do--- | 5 | 2.72 | 0.4 | | |
| 5308 | 4 | Activated carbon (Nuchar B-100 A). | 5 | 4.86 | 2.1 | 0.83 | |
| 5309 | ¹4 | ---do--- | ¹5 | 4.76 | 0.98 | 0.08 | |
| 5313 | 4 | Channel black (Kosmobile 77). | 5 | 5.6 | 2.35 | | 0.29 |
| 5346 | 3 | Lampblack | 5 | 3.94 | 0.63 | | |
| 5361 | 5 | Carbonaceous filter aid (Nuchar KD). | 5 | 0.49 | | | |
| 5333 | 5 | Carbonaceous filter aid (Nuchar KPC). | 5 | 0.18 | | | |
| 5367 ² | 5 | ---do--- | 5 | 0.49 | | | |
| 5364 | 5 | None | | 8.47 | | 4.02 | ³1.15 |
| 5362 | 5 | Carbon⁴ | 5 | 3.33 | | 0.94 | |

¹ Catalyst and co-catalyst recycled.
² Reaction in mild steel container.
³ Time, 120 minutes.
⁴ Same carbon as used for supporting Pt Catalyst.
* Minutes.

The data in Table I demonstrate catalytic effect of carbon on the combined reactions known as reductive alkylation. Experiment 5309 shows that catalytic effect is not impaired after use in one reaction and that the catalyst may be recycled and used in subsequent reactions. Experiment 5367 demonstrates reaction in mild steel. Salicylic acid will dissolve enough iron under similar conditions to stop the reaction completely. It will be noted from Experiment 5362 that addition of the same carbon used to support the platinum catalyst increases the reaction efficiency. Although the same result can be achieved by addition of 10 grams of 1% platinum on carbon, this is a needless loading of expensive platinum catalyst and formation of carbinol becomes excessive. For example, the recovered ketone contains 11.3% carbinol as compared to 1.8% in Experiment 5363. The step of adding a catalyst consisting essentially of carbon is contemplated in carrying out the present process, although other catalysts may be present.

Table II illustrates the effect of ratio of carbonyl compound to amine. A pressure vessel is charged with 1.0 gram mole of p-nitroaniline and the indicated quantities of methyl isoamyl ketone, 1% platinum supported on carbon, and activated carbon co-catalyst (Nuchar C–115). The nitro compound is reduced at 100° C. under 200 pounds per square inch hydrogen pressure and the imine reduced at 150° C. under 400 pounds per square inch hydrogen pressure. The unreacted intermediates are determined after heating 60 minutes under hydrogen pressure.

TABLE II

| Exp. No. | Molar Ratio of Methyl Isoamyl Ketone to p-Nitroaniline | Hydrogenation Catalyst, grams | Co-Catalyst, grams | Percent Unreacted Intermediates After 60 Min. |
| --- | --- | --- | --- | --- |
| 7616 | 3.0 | 5.0 | 5.3 | 0.70 |
| 7634 | 2.2 | 6.0 | 6.0 | 0.3 |
| 7621 | 2.1 | 5.0 | 5.0 | 0.96 |

In Experiment No. 7621 the reaction is essentially complete after 60 minutes with only 5% excess of ketone. Dialkyl ketones containing 6–12 carbon atoms are less readily condensed with amines than lower dialkyl ketones but are required in only 5–35% excess in the present process. Similar results cannot be obtained with acids. This is demonstrated by comparing the effect of carbon co-catalyst to salicylic acid co-catalyst under identical conditions. The pressure vessel is charged with 1.0 gram mole of p-nitroaniline, 2.1 gram moles of methyl isoamyl ketone, 5 grams of 1% platinum as catalyst, and 5 grams of co-catalyst. The nitro compound is reduced at 100° C. with hydrogen at 200 pounds per square inch and the imine reduced at 130° C. with hydrogen at 400 pounds per square inch. The percent unreacted intermediates after two hours heating is as follows:

| Exp. No. | Co-Catalyst | Percent Unreacted Intermediates |
| --- | --- | --- |
| 7615 | Salicylic acid | 14.57 |
| 7617 | Activated carbon | 0.5 |

In general N,N'-di-secondary heptyl-p-phenylenediamine can be satisfactorily prepared with only 5% excess of methyl isoamyl ketone if carbon co-catalyst is added, whereas 100% excess is required for comparable results using salicylic acid as the co-catalyst.

To illustrate reductive alkylation of 4-aminodiphenylamine, the hydrogenator is charged with 261 grams or 1.22 moles of 4-nitrodiphenylamine, 287 grams or 2.87 moles of methyl isobutyl ketone, and 5.8 grams of 1% platinum on carbon. The nitro compound is reduced to amine at 100° C. under 200 pounds hydrogen pressure, and the imine reduced at 150° C. under 400 pounds hydrogen pressure except that in Experiment No. 4954 in the table below, the imine is reduced at 130° and in Experiments No. 5324 and 5326 it is reduced at 140° C.

TABLE III

| Exp. No. | Co-Catalyst | Grams | Percent Unreacted Intermediates After— | | | |
| --- | --- | --- | --- | --- | --- | --- |
| | | | *30 | *60 | *90 | *120 |
| 4962 | None | | 48.2 | 22.0 | | 8.3 |
| 4954 | Activated carbon (Nuchar B-100 A) | 5.0 | 33.5 | 13.3 | 3.4 | 1.47 |
| 4970 | Activated carbon (Darco G-60) | 5.8 | 24.1 | 6.4 | 1.5 | |
| 4980 | Activated carbon (Norit A) | 5.8 | 12.3 | 1.4 | 0.24 | |
| 4981 | Carbonaceous filter aid (Nuchar KD) | 5.8 | 6.6 | 0.67 | | |
| 4982 | Carbonaceous filter aid (Nuchar KPC) | 5.8 | 7.2 | 0.09 | | |
| 4984 | Carbon [1] | 5.8 | 29.2 | 12.1 | 4.6 | 1.4 |
| 4985 | Activated carbon (Nuchar C-115 A) | 5.8 | 8.6 | 0.1 | | |
| 5324 | Activated carbon (Nuchar B-100 N) | 6 | 16.69 | 1.69 | 0.05 | |
| 5326 | Semi-reinforcing carbon (Thermax) | 6 | 40.9 | 20.57 | | 4.15 |
| 5329 | Lampblack | 6 | 33.15 | 11.22 | 3.33 | 0.62 |
| 7603 | Activated carbon (Nuchar C) | 5.8 | 21.8 | 3.6 | | |
| 7604 | Activated carbon (Nuchar C-115 N) | 5.8 | 23.3 | 3.3 | | |

[1] Same carbon as used to support Pt Catalyst.
*Minutes.

Again, the use of reduced ratios of methyl isobutyl ketone to amine is feasible in the presence of carbon co-catalyst. The hydrogenator is charged with 261 grams or 1.22 moles of 4-nitrodiphenylamine, the indicated quantity of methyl isobutyl ketone, 5.8 grams of 1% platinum on carbon, and 5.8 grams of carbonaceous filter aid (Nuchar KPC). The nitro compound is reduced at 100° C. under 200 pounds hydrogen pressure per square inch, and the imine reduced at 150° C. under 400 pounds hydrogen pressure per square inch. The percent of unreacted intermediates in the N-secondary hexyl N'-phenyl-p-phenylenediamine is indicated in the table below:

TABLE IV

| Exp. No. | Ratio MIBK/4-NDPA | Percent Unreacted Intermediates After— | | |
| --- | --- | --- | --- | --- |
| | | *30 | *60 | *90 |
| 4998 | 1.88 | 19.6 | 4.8 | 1.5 |
| 5000 | 1.58 | 23.8 | 6.3 | 1.76 |
| 5387 | 1.25 | 16.7 | 5.46 | 2.6 |
| 5389 | 1.1 | 28.9 | 11.57 | 4.47 |

*Minutes.

In general, it is preferred to employ 25–50% excess of ketone for the preparation of N-secondary alkyl N'-phenyl-p-phenylenediamines and this can easily be reduced to 25–30% excess for ketones containing 6–12 carbon atoms in the alkyl radical. With salicylic acid, 150% excess is required.

The catalytic effect of carbon on imine reduction is demonstrated by preparing the imine under non-hydrogenating conditions and comparing results from reduction in the presence and absence of carbon co-catalyst.

For preparation of a solution of the imine 261 grams or 1.22 molecular proportions of 4-nitrodiphenylamine in 325 grams of xylene is reduced over 1 gram of 1% platinum on carbon. The reduction is conducted at 110–120° C. at hydrogen pressure of 200 to 400 pounds per square inch. After heating for 90 minutes, the reaction mixture is filtered and most of the water removed by distillation. The reaction is repeated and the products combined. The remainder of the water and 537 grams of the xylene are removed by distillation to obtain a xylene solution of 2.26 moles of p-aminodiphenylamine. This is mixed with 800 grams or 7 moles of methyl isoamyl ketone and 3 grams of salicylic acid. This charge is heated at refluxing temperatures for about one hour at which time the theoretical amount of water is collected. To assure complete reaction heating is continued for about 35 minutes. Then 187 ml. of the ketone is removed by distillation leaving as a residue 1173 grams of imine solution. This is kept under a blanket of nitrogen and divided in two equal portions. To each portion is added 6 grams of 1% platinum on carbon. To one portion there is further added 6 grams of activated carbon co-catalyst (Nuchar C-115). The imine is then reduced by heating with molecular hydrogen at 200 pounds per square inch and the per cent of unreacted imine determined after various time intervals. The catalytic effect of the carbon is apparent from the results below:

TABLE V

| Time in minutes | Temperature, degrees C. | Percent Unreacted Imine | |
|---|---|---|---|
| | | No Co-Catalyst | Carbon Co-Catalyst |
| 15 | 110–115 | 70.62 | 60.52 |
| 30 | 150 | 26.23 | 10.50 |
| 60 | 150 | 8.47 | 0.97 |
| 90 | 150 | 5.38 | 0.13 |
| 120 | 150 | 3.43 | |
| 150 | 150 | 2.51 | |

As an example of reacting a lower dialkyl ketone, a hydrogenator is charged with 200 grams or 1.03 mole of 4-nitrodiphenylamine, 87 grams or 1.5 moles of acetone, 120 grams of xylene, 5 grams of 1% platinum on carbon, and 5 grams of carbonaceous filter aid (Nuchar KPC). The nitrodiphenylamine is reduced at 90° C. under 200 pounds hydrogen pressure per square inch. When the hydrogen up-take subsides, the temperature of the reaction mixture is raised to 130° C. and the reaction continued under 400 pounds hydrogen pressure per square inch. After 42 minutes the unreacted intermediates are reduced to 1.22%. The crystallization point of the N-isopropyl N'-phenyl-p-phenylenediamine so produced is 75° C.

The use of a solvent as in the foregoing example is merely a matter of convenience when reacting a normally solid nitro compound or amine. The xylene may be omitted and equivalent results obtained. To produce N-isopropylaniline, a hydrogenator is charged with 369.3 grams (3.0 moles) of nitrobenzene, 361.5 grams (4.5 moles) of acetone, 9.75 grams of 1% platinum on carbon, and 9.75 grams of active carbon (Nuchar C-115 alkaline, total acidity 0.59 milliequivalents per gram). The charge is heated to 110° C. and the exothermic nitro reduction effected at 110°–140° C. at 300 pounds per square inch hydrogen pressure. The remainder of the reaction is effected at 160°–165° C. at 400 pounds per square inch hydrogen pressure. After 210 minutes less than 1% unalkylated aniline remains.

The catalytic influence of carbon is demonstrated and differences between them is accentuated by adding various carbons to reactions of 4-nitrodiphenylamine of equivalent quality with a reduced ratio of methyl isobutyl ketone. The hydrogenator is charged with 317 grams (1.48 moles) of 4-nitrodiphenylamine, 185 grams (1.853 moles) of methyl isobutyl ketone (MIBK/4-NDPA ratio 1.25), 7.2 grams of 1% platinum on carbon, having a bound acidity of 0.1 milliequivalents per gram, and 7.2 grams of carbon co-catalyst as indicated. The nitro compound is reduced at 100° C. under 200 pounds per square inch hydrogen and the imine reduced at 150° C. under 400 pounds per square inch hydrogen pressure. The unreacted intermediates are determined after reacting 90 and 120 minutes, respectively. Reaction time is counted from the time hydrogen pressure is applied. The total and free acidities of the particular samples of carbon co-catalyst added determined by methods hereinafter described are recorded.

TABLE VI

| Exp. No. | Co-Catalyst | Acidity, milliequivalents per gram | | Percent Unreacted Intermediates After— | |
|---|---|---|---|---|---|
| | | Total | Free | *90 | *120 |
| 5210 | Nuchar KPC | .60 | .004 | 2.1 | |
| 5215 | Nuchar C-115-N | .41 | .002 | 5.8 | 1.9 |
| 5243 | Nuchar B-100-A | .45 | .02 | 7.0 | 2.3 |
| 4597 | Nuchar C-1000-N | .60 | .003 | 7.0 | 3.9 |
| 5242 | Nuchar C-190-Granular | .64 | nil | 8.8 | 3.8 |
| 5214 | Nuchar CEE Granular | .71 | nil | 9.8 | 4.0 |
| 4593 | Nuchar C-115-B | .59 | nil | 10.2 | 5.2 |
| 5202 | Norit A | .68 | .061 | 14.1 | 7.6 |
| 5229 | Darco G-60 | .31 | .008 | 17.2 | 9.1 |
| 5204 | Statex 125 | .37 | .008 | 42.0 | 28.8 |
| 5213 | Dixie 5 | .32 | nil | 45.1 | 32.9 |
| 5205 | Kosmobile 77 | .42 | .002 | 47.5 | 35.8 |
| 4596 | Norit A | .45 | nil | 57.5 | 47.9 |
| 5274 | Graphite | | | 61.0 | |
| 5209 | Regal 600 | .09 | .002 | 66.0 | 57.3 |
| 5203 | Thermax | .08 | .002 | 67.4 | 56.9 |
| 5211 | None | | | 74.7 | 66.1 |

*Minutes.

The carbon co-catalyst may advantageously be used as a carrier for the platinum and the total catalyst loading thereby reduced with nearly equivalent results. Catalyst compositions are prepared by depositing 1% platinum on co-catalyst of Table VI. Then 7.2 grams of each composition is employed with 317 grams of 4-nitrodiphenylamine and 185.3 grams of methyl isobutyl ketone. The reaction is conducted as described above and the unreacted intermediate determined after 90 and 120 minutes, respectively. Typical results are recorded in the table below. Also recorded is the total acidity of the catalyst composition after deposition of the platinum.

TABLE VII

| Exp. No. | 1% Platinum on— | Acidity, milliequivalents per gram, Total | Percent Unreacted Intermediate After— | |
|---|---|---|---|---|
| | | | *90 | *120 |
| 5220 | Nuchar KPC | .78 | 18.3 | 10.9 |
| 5216 | Nuchar C-1000-N | .63 | 41.7 | 29.5 |
| 5217 | Nuchar C-115-B | .50 | 14.8 | 8.0 |
| 5221 | Norit A | .24 | 86.5 | 82.1 |

*Minutes.

The bound acidity of the carbon is evidently significant. Otherwise, it should be possible to add acid to carbon having low total acidity and poor catalytic activity and thereby match the activity of carbon having high bound acidity and total acidity equivalent to the total acidity of the acidified carbon. However, the improvement achieved by adding organic acid to carbon of low acidity falls far short of that achieved by using carbon of high bound acidity. Even more significant is the fact that the reactions in the presence of acidified carbon do not go to completion even after prolonged heating. Employing the same 1% platinum on carbon catalyst used as the control in Table VI, Experiment 5211, and employing the same charge and reaction conditions described in connection with Table VII, reductive alkylations are conducted after adding to the catalyst organic acid sufficient to bring the added acidity to 0.5 milliequivalents per gram. The catalyst immediately absorbs the small amount of acetic acid, leaving the composition unchanged to all outward appearances. Typical results are recorded below:

TABLE VIII

| Exp. No. | Acid | Grams | Percent Unreacted Intermediates After Heating— | | | |
|---|---|---|---|---|---|---|
| | | | *90 | *120 | *450 | *480 |
| 5246 | Glacial acetic | 0.216 | 36.5 | 28.3 | 12.0 | |
| 5247 | Salicylic | 0.497 | 49.1 | 38.2 | | 8.2 |

*Minutes.

Although the results show that acidified carbon is not equivalent to carbon of comparable acidity in which the acidity is essentially all bound acidity, it will be appreciated from comparing the results with Experiment 5211 of Table VI that catalytic effect is improved by acidifying the carbon. Carbons having total acidities of 0.5 and above, reagrdless of the ratio of free and bound acidities, exert significant catalytic effect. Absorbing the acid on the carbon helps to maintain the acid in the organic layer of the reaction mixture. However, bound acidity is critical for further improvement, and it is preferred that the free acidity be not more than about 0.1 milliequivalents per gram and the bound acidity at least about 0.3 milliequivalents per gram. The optimum appears to be within the range of 0.4–1.0 bound acidity.

The foregoing examples illustrate the invention and the best mode of carrying it out, but it will be apparent that the catalytic effect of carbon can be applied to many reactions besides those described. Selecting the optimum carbon catalyst is to a large extent empirical because the significant variables remain unknown. Undoubtedly the surface characteristics influence the results. Trace elements which may be present possibly influence catalytic efficiency. Probably the structure of the carbon, its previous history, process by which it is made, and the source of the starting material all influence results. Many source materials are used for the production of carbon. These include blood, bones, carbohydrates, cereals, coal, coconut shells, coffee beans, corn cobs and corn stalks, cottonseed hulls, distillary waste, graphite, kelp and sea weed, leather waste, lignin, lignite, oil shale, petroleum acid sludge, petroleum coke, pup mill waste, rice hulls, rubber waste, sawdust, and wood. The evidence indicates that carbon from any source gives significant catalytic effect. It is, however, preferred to use carbon made from by-products in the manufacture of cellulose. The reason for the greater efficiency of these carbons is not known.

Carbons are treated in various ways to increase the adsorptive power. Active carbon is a term which can be applied to any form of carbon which possesses adsorptive power. Carbons subjected to special treatment for increasing adsorptive power are useful for the present invention, but the catalytic effect does not require activated carbon. There is some evidence that the total acidity of the carbon is connected with its efficiency. For reasons already explained, significant free acidity is undesirable because of corrosion to equipment, but it is unnecessary to select carbon having high free acidity. On the other hand, bound acidity does not lead to corrosion, and carbons having a bound acidity of at least 0.2 milliequivalents per gram have proved to be the most efficient.

Total acidity may be determined by the method described by D. Rivin, "Study of the Surface Chemistry of Carbon Black," Proceedings of the Fourth Rubber Technology Conference, page 265. Bound acidity is determined by the difference between total and free acidity. The procedures used are based on the method described by Rivin. For total acidity a 3-gram sample of carbon is weighed into a 2-ounce screw-cap bottle. The air in the bottle is displaced by nitrogen after which 20 ml. of 1.0 N sodium hydroxide is added. The capped bottle is allowed to stand at room temperature for seven days with periodic shaking. The slurry is then filtered and the cake washed with two 50 ml. portions of distilled water. The filtrate is titrated with 0.5 N hydrochloric acid. Free acidity is determined by adding 25 ml. of 50/50 mixture of isopropyl alcohol and water to the carbon sample. The slurry is permitted to stand for seven days with periodic shaking, filtered, and the cake washed with water as described. The filtrate is titrated with 0.1 N sodium hydroxide.

The results obtained on a series of carbons are summarized in the table below. The carbons are identified by their trade designation. Statex 125 is an intermediate, super-abrasion furance black. Darco G–60 is an activated carbon produced from wood charcoal Dixie 5 is a general purpose gas black and Kosmobile 77 is a channel black. Norit A is active vegetable carbon powder, non-chemically treated. The Nuchars are carbons made from residual material obtained in the manufacture of cellulose. Thermax is a soft semi-reinforcing carbon obtained by the thermal decomposition of natural gas. Regal 600 is a low-structure furnace black.

In general, only a minor influence on catalytic activity is observed whether the carbon co-catalyst is in granular, pellet, or powder form. However, the experimental evidence indicates a preference for powdered form. Ordinarily, Nuchars which have not had the pH adjusted are in granular form and Nuchar C–115 without other designation is used herein to mean granular product and, as explained hereinafter, the pH of an aqueous slurry is alkaline. The granular product may be ground if desired to pass through an 80-mesh screen. Nuchar C–155 alkaline is used herein to designate specifically the powder produced from the granular.

TABLE IX

| Sample | Milliequivalent per gram | | |
|---|---|---|---|
|  | Total Acidity | Free Acidity | Bound Acidity |
| Nuchar CEE | 0.35 | nil | 0.35 |
| Nuchar C | 0.49 | nil | 0.49 |
| Nuchar KPC | 0.60 | 0.004 | 0.596 |
| Nuchar C–115 [1] | 0.67 | nil | 0.67 |
| Nuchar KD | 0.46 | 0.015 | 0.445 |
| Nuchar B–100 N | 0.65 | 0.002 | 0.648 |
| Nuchar C–190 [1] | 0.28 | nil | 0.28 |
| Nuchar C–1000 N | 0.89 | 0.002 | 0.888 |
| Dixie 5 | 0.36 | 0.002 | 0.358 |
| Norti A | 0.54 | 0.061 | 0.479 |
| Kosmobile 77 | 0.38 | 0.002 | 0.378 |
| Nuchar C–1000 [1] | 0.16 | [2] 0.005 | 0.16 |
| Nuchar C–115 Alkaline | 0.81 | nil | 0.81 |
| Thermax | 0.05 | 0.002 | 0.048 |
| Regal 600 | 0.08 | 0.002 | 0.078 |
| Darco G–60 | 0.18 | 0.013 | 0.167 |
| Statex 125 | 0.46 | 0.008 | 0.452 |
| Nuchar C–115 A | 0.52 | 0.003 | 0.517 |
| Lampblack | 0.25 | 0.006 | 0.244 |
| Carbon Carrier | 0.17 | nil | 0.17 |

[1] Granular.
[2] Sample contained free base rather than acid.

The acidities in Table IX are merely representative and will vary from lot to lot. Also, determining acidity in duplicate and taking the average are desirable to minimize experimental error. All of the free acidities in Table IX may be considered negligible. It should be appreciated that the pH range of a distilled-water extract of a carbon co-catalyst may be alkaline although the carbon may have considerable bound acidity. For the industrial grades of the Nuchars, the letters "A" and "N" following the grade designation refer to the pH range of a distilled water extract of the carbon. "A" range is pH 4.5 to 6.0; "N" range is pH 6.1 to 8.0. Powdered industrial grades are supplied with the pH adjusted using sulfuric acid, with hydrochloric acid optional. The granular grades do not have the pH adjusted and are alkaline with a pH range of 8 to 10. These preferred carbons are made from residual organic material recovered from cellulose liquor. After separation of the tall oil and recovery of sodium sulfate from the residue, an organic mixture containing the liquors remains. The said organic mixture is then digested with sulfuric acid and carbonized. The carbonized products, whether activated or not, are the most desirable co-catalysts. According to the Kirk-Othmer Encyclopedia of Chemical Technology (1948), vol. II, page 889, active carbon from sulfite or sulfate (Kraft) waste is characterized by higher sulfur content. In general, a carbon made from cellulose is preferred to carbon made from petroleum oil, gas, or coal. It will be appreciated that determination of acidity does not distinguish between kinds of acidity which may be present. Phenolic hydrogen would not necessarily exert catalytic action similar to that of sulfonic hydrogen.

The term "carbon" is used herein in the generic sense to be synonymous with the class composed of graphite and "amorphous carbon," the latter term being used to distinguish from graphite and diamond, although it has come to be recognized that other carbons have some crystallinity, Kirk-Othmer, supra. Carbon black is carbon prepared by incomplete combustion of natural gas or petroleum, and charcoals are carbons prepared from plant and animal materials.

The carbonyl compounds mentioned above are only illustrative, and as further examples of carbonyl compounds useful in the process of the invention there may be mentioned alicyclic ketones, as, for example: cyclohexanone, 2-methyl cyclohexanone, 3-methyl cyclohexanone, 4-methyl cyclohexanone, 3,4-dimethyl cyclohexanone, 2,4-dimethyl cyclohexanone, 3,5-dimethyl cyclohexanone, 2,5-dimethyl cyclohexanone, 2-ethyl cyclohexanone, 4-ethyl cyclohexanone, 2-propyl cyclohexanone, 4-propyl cyclohexanone, 4-isopropyl cyclohexanone, 4-butyl cyclohexanone, 4-tertiary butyl cyclohexanone, alpha-tetralone, beta-tetralone, carvenone, menthone, and 3,5-dimethyl 2-cyclohexene-1-one; alkyl ketones, as for example: acetone, ethylmethyl ketone, diethyl ketone, methylpropyl ketone, methylbutyl ketone, methyl secondary butyl ketone, methyl isobutyl ketone, methyl tertiary butyl ketone, methyl amyl ketone, methl hexyl ketone, methyl heptyl ketone, methyl octyl ketone, methyl decyl ketone, and acetophenone; aldehydes, as, for example: formaldehyde, acetaldehyde, propionaldehyde, butyraldehyde, valeraldehyde, caproaldehyde, heptaldehyde, and benzaldehyde.

Any ammonia compound containing two reactive hydrogens undergoes condensation readily. These include ammonia, aniline, alkyl anilines such as ortho-, meta-, and para-toluidine, para-ethyl-, propyl-, or isopropyl aniline, para-butyl aniline, amyl-, hexyl-, heptyl-, octyl-, nonyl-, decyl-, dodecyl-, or hexadecyl- aniline, 2,4,6-trimethyl aniline; alkoxyanilines such as 3,4-dimethoxy aniline, 2,3-dimethoxy aniline, 2,4,6-trimethoxy aniline, para-anisidine, para-phenetidine, para-propoxy aniline, para-isopropoxy aniline, para-butoxy aniline, para-amyloxy aniline, para-hexyloxy aniline, para-heptyloxy aniline, para-octyloxy aniline, para-nonyloxy aniline, para-decyloxy aniline, para-dodecyloxy aniline; aryloxy aniline, as, for example: para-phenoxy aniline, para-tolyloxy aniline; alkyl amines, as, for example: methyl-, ethyl-, propyl-, isopropyl-, butyl-, secondary butyl-, tertiary butyl-, amyl-, hexyl-, heptyl-, octyl-, 2-ethyl hexyl-, secondary octyl-, tertiary octyl-, decyl-, or hexadecyl amine, cyclohexyl amine, 2-furanamine, and furfurylamine; alkylene diamines, as, for example: ethylene diamine, 1,4-butane diamine, 1,5-pentane diamine, 1,2-propane diamine, 1,3-propane diamine, 1,2-butane diamine, arylene diamines, as for example: para-phenylene diamine, para-cyclohexyl amino aniline, 4-methyl amino aniline, 4-ethyl amino aniline, 4-propyl amino aniline, 4-isopropyl amino aniline, 4-butyl amino aniline, 4-tertiary butyl amino aniline, 4-octyl amino aniline, 4-tertiary octyl amino aniline, 4-dodecyl amino aniline, para-amino diphenyl amine.

As illustrated herein it is feasible to charge the nitro compound corresponding to the desired amine reactant and reduce it to the amine in the same reactor employed for forming the imine and reducing it to secondary amine. Suitable nitro reactants include nitrobenzene, ortho-ethoxy nitrobenzene, 4-nitrobenzene, 4-ethoxy nitrobenzene, para-propoxy nitrobenzene, para-isopropoxy nitrobenzene, ortho-, meta-, or para-ethyl nitrobenzene, para-propyl nitrobenzene, para-isopropyl nitrobenzene, ortho- meta-, or para-butyl nitrobenzene, para-amyl nitrobenzene, para-hexyl nitrobenzene, para-octyl nitrobenzene, para-decyl nitrobenzene, para-dodecyl nitrobenzene, para-secondary octyl nitrobenzene, para-tertiary octyl nitrobenzene, para-tertiary dodecyl nitrobenzene, para-phenoxy nitrobenzene, para-cyclohexyl nitrobenzene, para-furyl nitrobenzene, para-benzyl nitrobenzene, para-dinitro benzene, meta-dinitro benzene, 2-, 3-, or 4-nitro toluene, 2,4-dinitro toluene, 4-nitro diphenyl, N-methyl-para-nitroaniline, N-ethyl-para-nitroaniline, N-isopropyl-para-nitroaniline, N-secondary butyl-para-nitroaniline, N-secondary amyl-para-nitroaniline, N-secondary hexyl-para-nitroaniline, N-secondary octyl-para-nitroaniline, N-secondary nonyl-para-nitroaniline.

Although the invention has been illustrated by use of a platinum catalyst, it will be appreciated that other hydrogenated catalysts may be employed. A wide variety of these are known to the art. They include rhodium, ruthenium, platinum, palladium, Raney nickel, Raney cobalt, copper chromite, iridium, osmium, oxides of chromium, and oxides of molybdenum. These catalysts may be supported on charcoal, alumina, pumice, kieselguhr, silica gel, or barium sulfate, but for reasons explained, carbon support is preferred. The platinum metals are preferred, which metals comprise two groups of the periodic system and include Tc, Ru, Rh, Pd, Re, Os, Ir, and Pt.

It is intended to cover all changes and modifications of the examples of the invention herein chosen for purposes of disclosure which do not constitute departures from the spirit and scope of the invention.

What is claimed is:

1. In a process for the production of imines by reacting carbonyl compounds with primary amines whereby the double bond of the carbonyl groups is linked to nitrogen of the primary amine, the improvement which comprises adding to the reactants a catalyst consisting essentially of carbon having a total acidity of at least about 0.4 milliequivalents per gram, the ratio of said carbon catalyst to other carbon present being not more than about 2.5 to 1 parts by weight.

2. In a process for the production of imines by reacting dialkyl ketone with primary amines whereby the double bond of the carbonyl group in the ketone is linked to nitrogen of the primary amine with splitting out of water, the improvement which comprises carrying out the reaction between the ketone and the primary amine under non-hydrogenating conditions in the presence of a carbon catalyst.

3. In a process of reductive alkylation for the production of secondary amines through the corresponding imine by reacting aromatic nitro compound, dialkyl ketone, and hydrogen in the presence of metal hydrogenation catalyst, the improvement which comprises adding to the reactants a co-catalyst consisting essentially of carbon having a total acidity of at least about 0.4 milliequivalents per gram, the ratio of carbon co-catalyst to other carbon present being not more than about 2.5 to 1 parts by weight.

4. The process of claim 3 wherein the aromatic nitro compound is para-nitroaniline wherein the dialkyl ketone contains 6–12 carbon atoms, inclusive, wherein the metal is platinum and the co-catalyst is charcoal having a bound acidity of at least 0.4 milliequivalents per gram.

5. The process of claim 4 wherein an excess of ketone within the range of 5–35% is employed.

6. The process of claim 3 wherein the aromatic nitro compound is 4-nitrodiphenylamine, the dialkyl ketone contains 3–12 carbon atoms, inclusive, the metal is platinum, and the co-catalyst is charcoal having a bound acidity of at least 0.4 milliequivalents per gram.

7. The process of claim 6 wherein aromatic amine is formed in situ from 4-nitrodiphenylamine, the ketone is a dialkyl ketone containing 6–12 carbon atoms, inclusive, and the ratio of ketone to 4-nitrodiphenylamine is not more than about 1.5.

8. In a process of reductive alkylation for the production of secondary amines through the corresponding imine by reacting primary aromatic amine or the corresponding nitro compound, ketone, and hydrogen in the presence of metal hydrogenation catalyst, the improvement which comprises carrying out the reductive alkylation in the presence of carbon as co-catalyst having a bound acidity of at least about 0.4 milliequivalents per gram, the ratio of said carbon co-catalyst to other carbon present being not more than about 2.5 to 1 parts by weight.

9. The process of claim 8 wherein the metal is a platinum metal.

10. The process of claim 8 wherein the metal is platinum and the carbon is charcoal having a bound acidity of at least 0.4 milliequivalents per gram and a free acidity of not more than 0.1 milliequivalents per gram.

11. The process of claim 10 wherein the charcoal is derived from residual organic material recovered from cellulose liquor.

12. The process of claim 11 wherein the reactants are 4-nitrodiphenylamine and dialkyl ketone containing 3–12 carbon atoms, inclusive.

13. The process of claim 11 wherein the reactants are para-nitroaniline and dialkyl ketone containing 6–12 carbon atoms, inclusive.

14. The process of claim 11 wherein the reactants are aniline and acetone.

15. The process of claim 14 wherein the aniline is formed in situ from nitrobenzene.

16. The process of claim 7 wherein the metal is platinum and the carbon has a bound acidity within the range of about 0.4–1.0 milliequivalents per gram.

17. The process of claim 11 wherein the charcoal is active carbon.

18. In a process of reductive alkylation for the production of secondary amines through the corresponding imine by reacting aromatic nitro compound, dialkyl ketones, and hydrogen in the presence of metal hydrogenation catalyst, the improvement which comprises carrying out the reductive alkylation in the presence of a catalyst comprising a platinum metal and carbon co-catalyst having a total acidity of at least 0.5 milliequivalents per gram, the ratio of said carbon co-catalyst to other carbon present being not more than about 2.5 to 1 parts by weight.

No references cited.

CHARLES B. PARKER, *Primary Examiner.*

L. C. MARUZO, *Assistant Examiner.*